US010524620B1

(12) United States Patent
Bindler et al.

(10) Patent No.: US 10,524,620 B1
(45) Date of Patent: Jan. 7, 2020

(54) SOAP GRATER AND DISPENSER

(71) Applicants: Yakov Bindler, Hastings on Hudson, NY (US); Jane Prokop, Hastings on Hudson, NY (US)

(72) Inventors: Yakov Bindler, Hastings on Hudson, NY (US); Jane Prokop, Hastings on Hudson, NY (US)

( * ) Notice: Subject to any disclaimer, the term of this patent is extended or adjusted under 35 U.S.C. 154(b) by 346 days.

(21) Appl. No.: 15/426,905

(22) Filed: Feb. 7, 2017

Related U.S. Application Data

(60) Provisional application No. 62/344,188, filed on Jun. 1, 2016.

(51) Int. Cl.

| | |
|---|---|
| ***A47J 42/34*** | (2006.01) |
| ***A47K 5/09*** | (2006.01) |
| ***B02C 19/20*** | (2006.01) |
| ***B02C 25/00*** | (2006.01) |

(52) U.S. Cl.
CPC ................ *A47K 5/09* (2013.01); *B02C 19/20* (2013.01); *B02C 25/00* (2013.01)

(58) Field of Classification Search
CPC ... A47K 5/09; A47K 5/08; A47K 5/00; B02C 19/20; B02C 25/00
See application file for complete search history.

(56) References Cited

U.S. PATENT DOCUMENTS

| | | | | |
|---|---|---|---|---|
| 534,117 A | | 2/1895 | Malzacher | |
| 879,780 A | | 2/1908 | Lewis | |
| 1,357,925 A | * | 11/1920 | Asel | A47K 5/09 241/273.2 |
| 2,029,701 A | * | 2/1936 | Burditt | A47K 5/09 241/277 |
| 2,349,017 A | * | 5/1944 | Storer | A47K 5/09 241/273.1 |
| 2,441,034 A | | 5/1948 | Pumphrey | |
| 2,480,271 A | | 8/1949 | Sumner | |
| 2,527,557 A | * | 10/1950 | Lang | A47K 5/09 241/602 |
| 2,893,960 A | * | 7/1959 | McNally | A47K 5/09 510/149 |
| 7,204,440 B2 | | 4/2007 | Fouse et al. | |
| 9,980,615 B1 | * | 5/2018 | Maercovich | A47K 5/1205 |
| 2007/0151419 A1 | * | 7/2007 | Nishio | B02C 19/20 75/770 |
| 2018/0078097 A1 | * | 3/2018 | Willingham | A47K 5/08 |
| 2018/0184855 A1 | * | 7/2018 | Maercovich | A47K 5/1205 |

* cited by examiner

*Primary Examiner* — Omar Flores Sanchez
(74) *Attorney, Agent, or Firm* — Derek Pressley

(57) ABSTRACT

An electrically powered soap grater and dispenser that automatically dispenses shaved and grated soap into a user's palm. A reciprocating electro-mechanical drive assembly causes a grater plate to reciprocate up and down as it cuts into a stationary bar of soap. A transparent window in the front of the housing lets the user see the soap stored within and shows when the soap needs to be replaced. An optional secondary support stand raises the housing high enough for a user to put his hand under it to receive the shaved soap. Alternately, the main housing can be hung on a wall of a bathroom or shower so that the user can easily place his or her hand under an aperture located in the housing's bottom wall and receive the shaved soap.

3 Claims, 9 Drawing Sheets

SOAP GRATER AND DISPENSER

CROSS REFERENCE TO RELATED APPLICATION

This application claims the benefit of U.S. Provisional Patent Application No. 62/344,188 filed Jun. 1, 2016 which application is hereby incorporated by reference.

BACKGROUND

Bars of soap have been used for many years as a convenient way to clean one's hands by rubbing the bar between wet hands and letting the soap mingle with water to create a soapy lather that can perform cleaning actions. Bar soap is often used in this way in household and other similar settings where access to the bar is limited to a relatively small number of familiar people. The use of bar soap often becomes less appealing in settings where it is available to large numbers of people due to worry of cross contamination or the bar being carried off, for example. These concerns can hamper use of specialty or luxury bar soaps (which have become increasingly popular in recent years) in settings where access is somewhat limited but still public in nature, such as in bathrooms of upscale restaurants, for example.

One way to overcome these concerns is to restrict access to the bar itself and allow removal of shavings from the bar which then can be used for cleaning purposes. Use of bar soap in this manner allows many people to use the same bar in a public setting without worry of cross contamination or loss. Therefore, it would be advantageous for those wishing to expand markets for specialty bar soaps to have an automated device which easily and conveniently provides shavings from bar soap without having to come into direct physical contact with the bars themselves. This would allow use of bar soap in settings where liquid hand soap dispensers are currently used.

Others have thought of and patented various soap slicing or grating devices. These include:

U.S. Pat. No. 534,117 issued in 1895 shows a push pull device that slices of pieces of soap like a modern mandolin kitchen product.

U.S. Pat. No. 879,780 shows a dispenser with a rocking action where each rotational up and down action slices off a piece of soap.

U.S. Pat. No. 2,441,034 discloses a soap dispenser that also uses a rotational motion to dispense soap that is already in a shredded form.

U.S. Pat. No. 2,480,271 shows a soap dispenser that has a reciprocating cutter blade which cuts on a 45-degree angle.

U.S. Pat. No. 7,204,440 shows a horizontally disposed rotary handle that causes a slicing action within a container. There is a push plate that forces the soap (or food) down into the grinding blades.

Although others have patented ways of slicing thin pieces of soap to be used for cleaning purposes, there still remains deficiencies in the prior art. One shortcoming is that soap cutting devices of the prior art use slicing actions, rather than a grating or shredding action, to cut the soap which results in larger pieces being produced. A grating action can produce finer soap shavings which make them easier and faster to dissolve when exposed to water. Another shortcoming is that prior designs do not provide fully automated systems which are configured to conveniently drop a portion of soap shaving into a person's hands for easy use in washing one's hands. Finally, previous designs do not allow users to easily see when the soap needs to be replaced. It would additionally be advantageous to display the bar of soap being grated so that people who enjoy the experience of using the soap gratings can take note of the soap brand and be able to perhaps purchase bars of that brand for their own private use.

SUMMARY OF INVENTION

A primary object of the invention is to provide an automated device for grating shavings of soap from a bar of soap and dispensing them into a person's hand for use in cleaning.

Another object of the invention is to provide a soap grater and dispenser that allows a person to insert a standard bar of soap into the grater and to visually see when the soap needs to be replaced.

One form of this invention is a congealed product grating and dispensing machine housed inside an housing. An electric motor mounted within the housing has a rotatable driveshaft. A guide channel that is oriented perpendicularly to the driveshaft's axis of rotation is mounted within the housing, over an aperture through a wall of the housing. A serrated plate is slidably engaged with the guide channel and is connected to the driveshaft through a transmission that translates rotational movement of the driveshaft into reciprocating movement of the serrated plate when the motor is energized. A congealed product feeder is mounted stationary within the housing and is arranged perpendicularly adjacent the guide channel. It is biased to feed congealed product toward the guide channel. An actuator in circuit with the motor energizes it for a preset time period when it is actuated.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF PREFERRED EMBODIMENTS

Detailed descriptions of preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
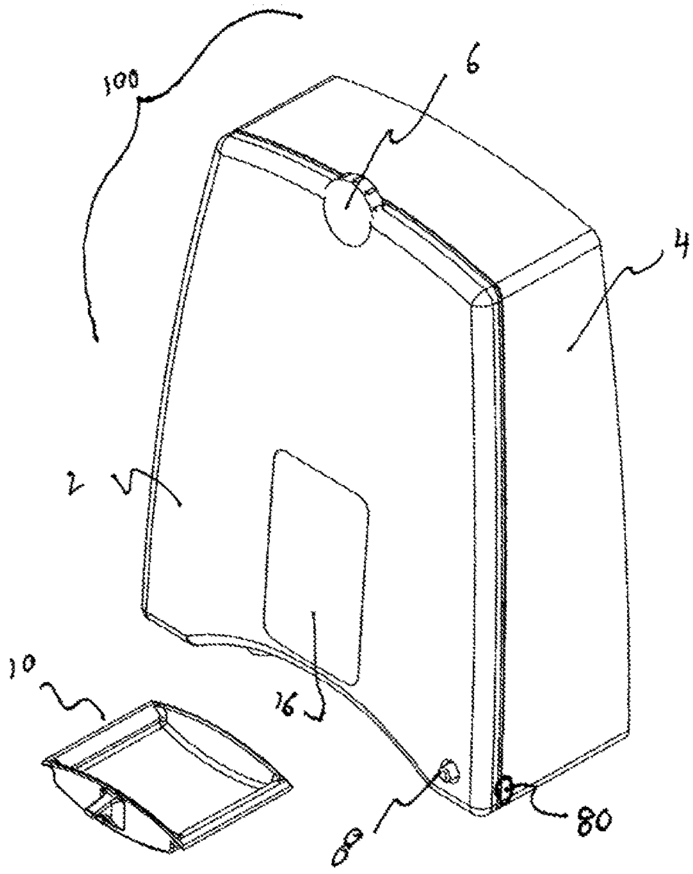
FIG. 1 is a perspective view of a preferred embodiment of a soap grater and dispenser according to the invention.

Referring now to FIG. 1 we see a perspective view of a preferred embodiment of a soap grater and dispenser according to invention 100. A main housing 4 encloses an electro-mechanical assembly that can grate soap automatically when the user pushes start switch 8. The front housing panel 2 is hinged 80 at the bottom edge and can be opened by twisting closure knob 6 and rotating the housing front 2 forward. A transparent window 16 allows the user to see the soap located within the housing 100. The user can view the condition of the soap 26 (FIG. 3) and can tell when new soap needs to be added. Slide out tray 10 catches the grated soap shavings when it is slid in place under the housing bottom. The user can then slide the tray out, as shown, and access the grated soap for use during normal washing activities.

Figure 2:
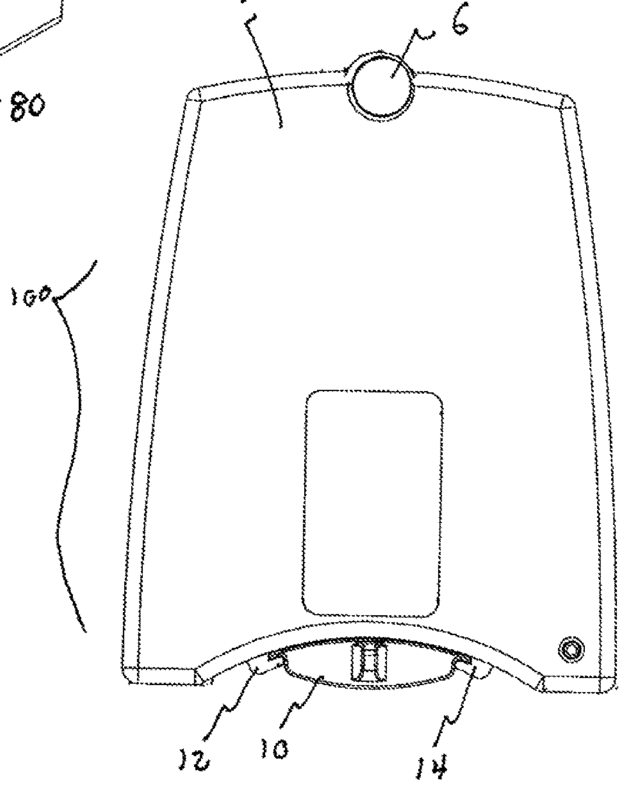
FIG. 2 is a front elevational view of the soap grater and dispenser of FIG. 1.

FIG. 2 is a front view of preferred embodiment 100. Flanges 12, 14 can be seen as they slidably retain the removable tray 10.

Figure 3:
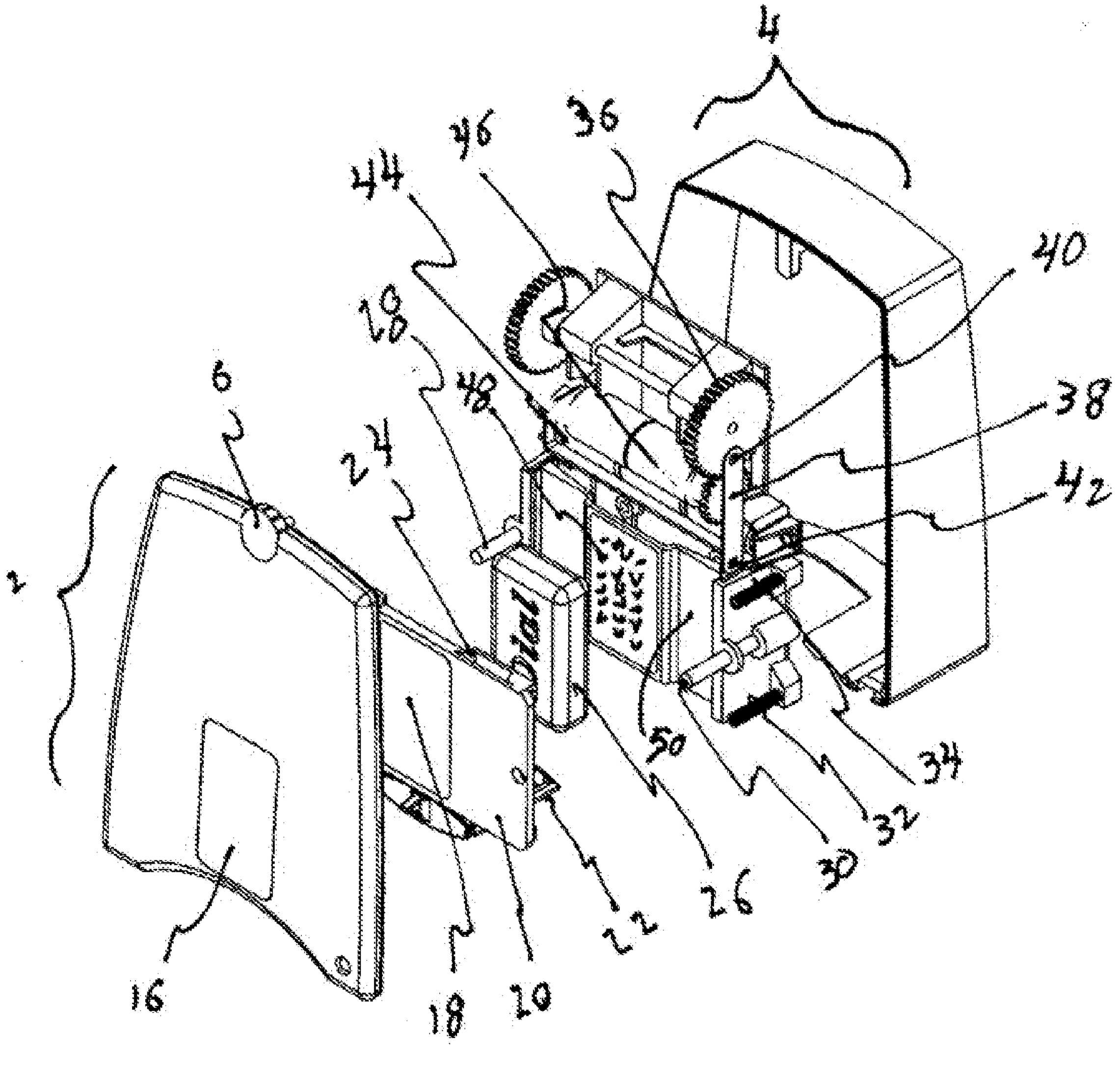
FIG. 3 is a partially-exploded perspective view of the soap grater and dispenser of FIG. 1.

FIG. 3 is an exploded view of preferred embodiment 100. An electro-mechanical reciprocating assembly includes gear motor 46 powered by batteries 44. The gear at the end of gear motor 46 engages large gear 36 which includes a perpendicularly disposed post 40 that creates a rotary connection for push-pull member 38. The other end of push-pull member 38 is rotatably attached to an integral slide member located along the edge of grate holding plate 50. The rotation of large gear 36 causes the push-pull member and grate holding plate to reciprocate. This action causes grater member 48 to shave bits of soap off of soap bar 26. Soap bar 26 is captured between grater plate 50 and nonmoving soap holder plate 20. The plate 20 includes perpendicular ledges 22, 24 that hold soap 26 in place as the grater 48 slides up and down on the surface of the soap. The soap holding plate is spring biased by springs 32, 34 and similar springs on the opposite side, not shown. Posts 28, 30 protrude through apertures in plate 20 to insure that the plate 20 cannot travel in an up or down fashion, but can be drawn inward, in a horizontal fashion by extension springs 32, 24. Soap holding plate 20 includes a transparent panel 18, that in combination with transparent plate 16 on housing front 2 allows the user to see the soap contained within the housing, and to see when the soap needs to be replaced.

Figure 4:
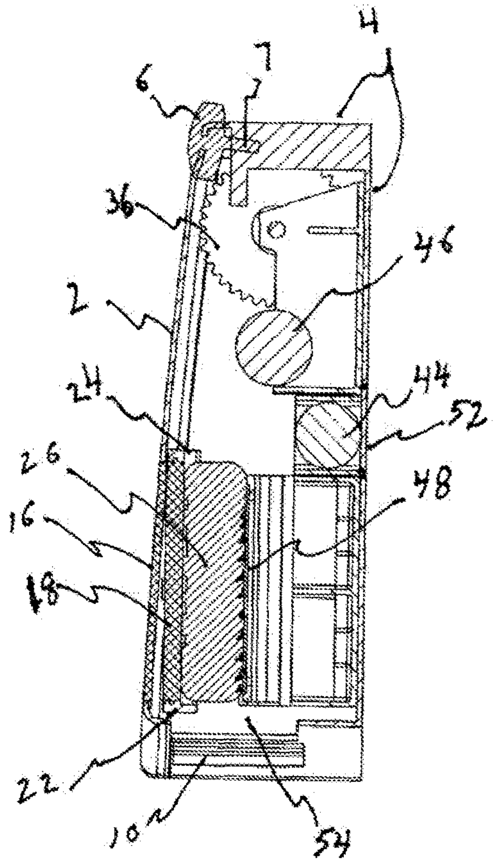
FIG. 4 is a side sectional view of the soap grater and dispenser of FIG. 1.

FIG. 4 is a side section view of preferred embodiment 100. Soap bar 26 can be clearly seen as it is trapped between spring biased soap plate window 18 and grater member 48. This view also shows that the underside of housing 2 has been removed at location 22 to forming a space 54 to allow soap particles to fall directly into tray 10. FIG. 4 also shows how knob 6 engages the housing 2 via attached screw post 7.

Figure 5:
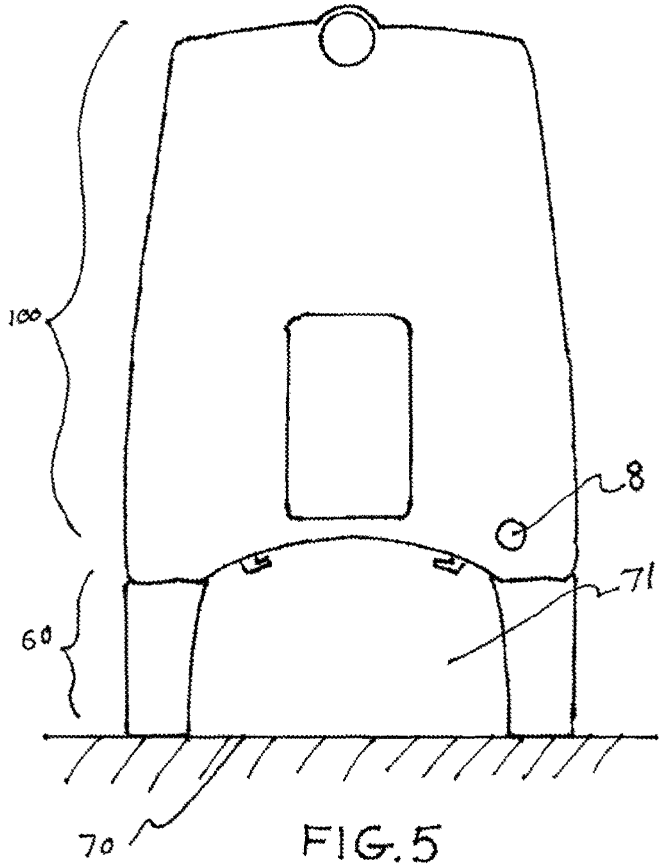
FIG. 5 is a front elevational view of a first variation of the soap grater and dispenser of FIG. 1, designed for placement on a flat surface.

FIG. 5 is a front view of preferred embodiment 100 as it is placed on a riser 60 so that when the unit 60,100 is placed on a flat surface 70 a person can place their hand into open area 71 beneath unit 100 and have soap particles be dispensed into the palm of the hand when switch 8 is pushed. Alternately, a motion sensor can be installed in the unit 100 to automatically sense when a hand is present, and automatically dispense a portion of grated soap into the hand.

Figure 6:
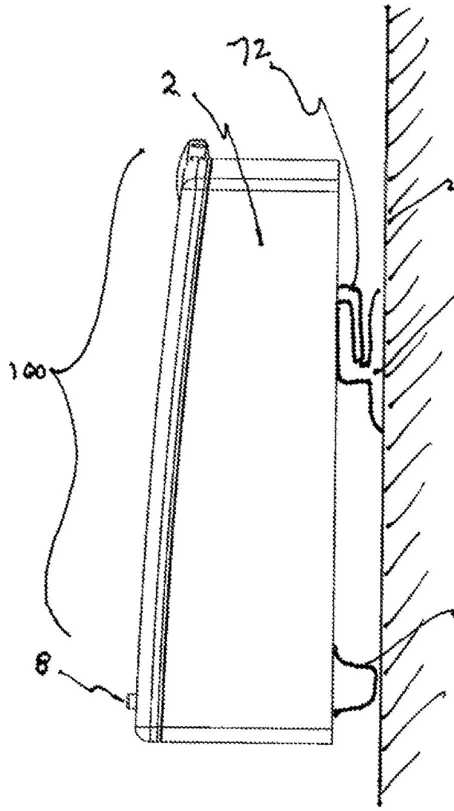
FIG. 6 is a side elevational view of a second variation of the soap grater and dispenser of FIG. 1, designed for hanging upon a vertical surface.

FIG. 6 is a side view of preferred embodiment 100 that includes a hanging bracket 72 that is attached to the back of the housing 2 and a wall bracket 74 that is attached to a wall 76 allowing the soap grater and dispenser 100 to hang on a wall of a bathroom or kitchen or other area so that a person can simply put their hands under the housing, push the on switch 8 and receive grated soap shavings to wash with.

Figure 7:
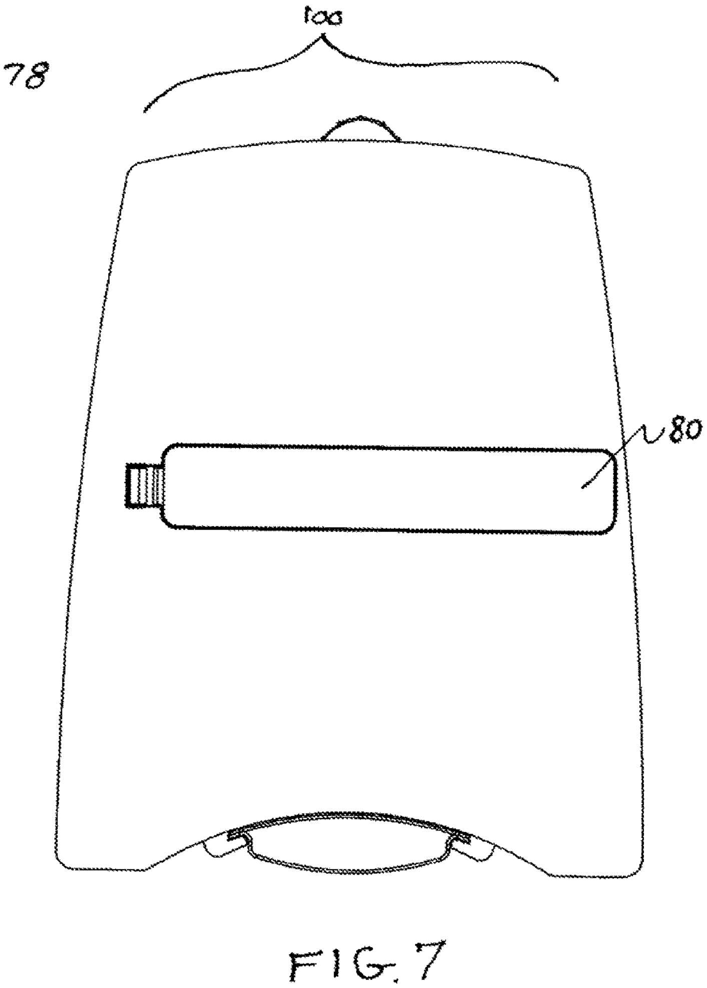
FIG. 7 is a rear elevational view of the soap grater and dispenser of FIG. 1.

FIG. 7 is a rear view of preferred embodiment 100 showing removable battery door 80.

Figure 8:
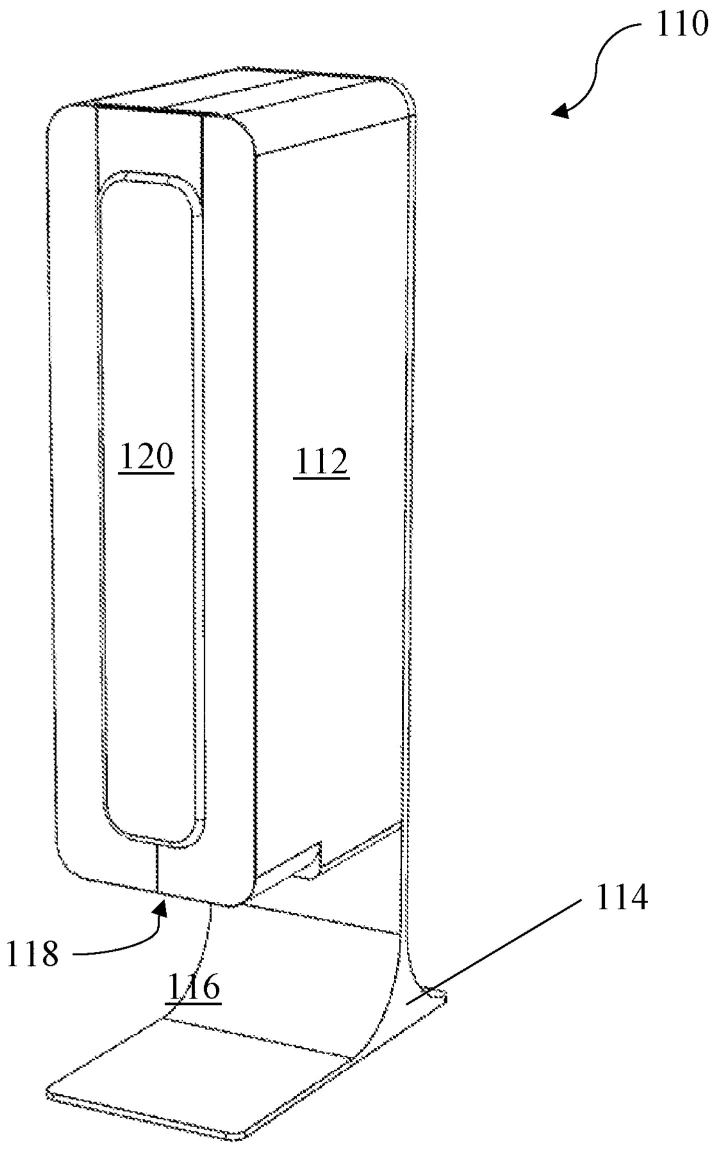
FIG. 8 is a perspective view of another preferred embodiment of a soap grater and dispenser according to the invention.

FIG. 8 shows another preferred embodiment of a soap grating and dispensing machine 110 according to invention. The internal working components of machine 110 are housed within housing 112 that is mounted to stand 114 to create dispensing area 116 beneath opening 118 of housing 112. Housing 112 preferably has a transparent window 120 to allow observation of operation and status of bar soap supply.

Figure 9:
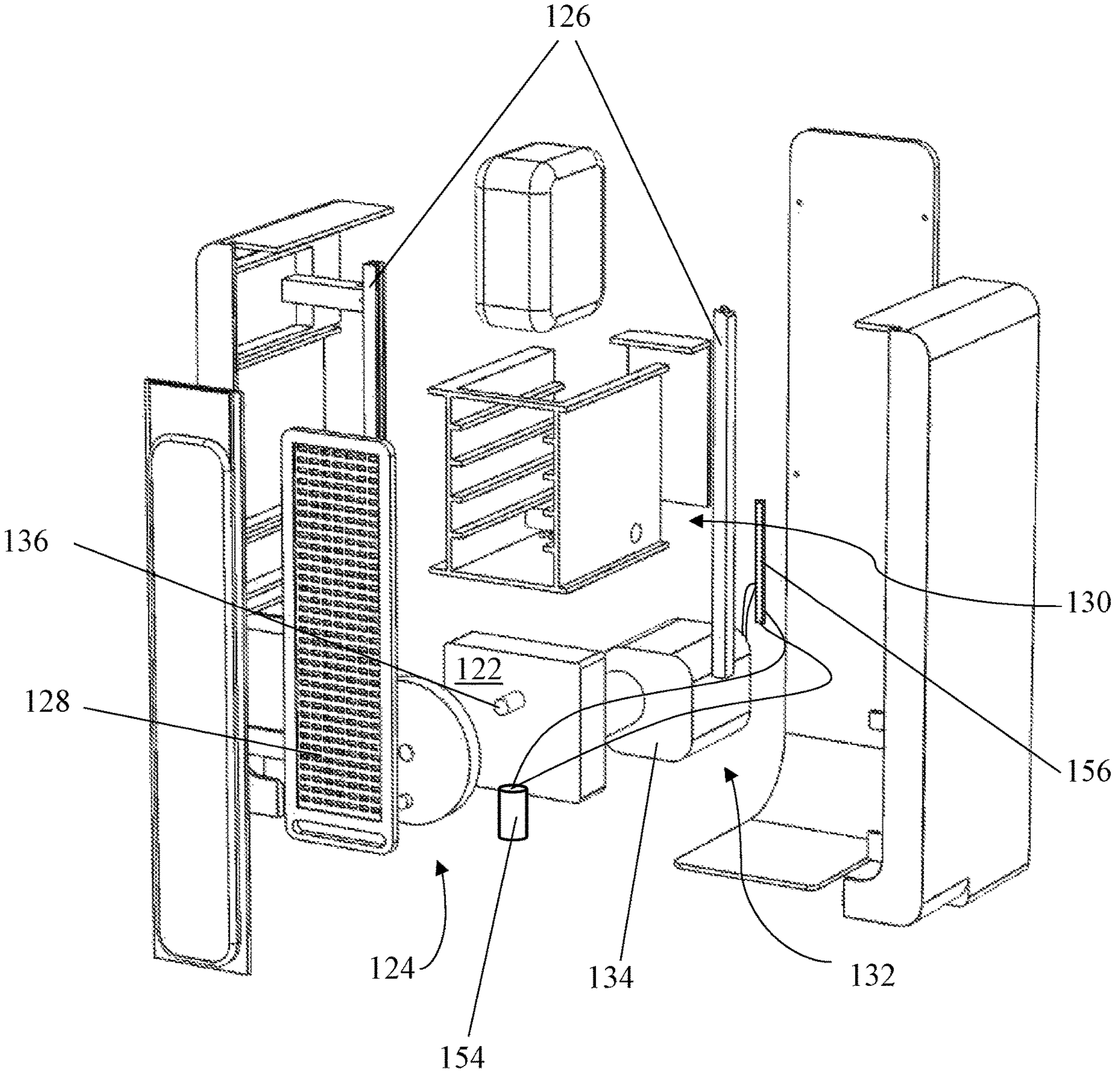
FIG. 9 is an exploded perspective view of the soap grater and dispenser of FIG. 8.
Figure 10:
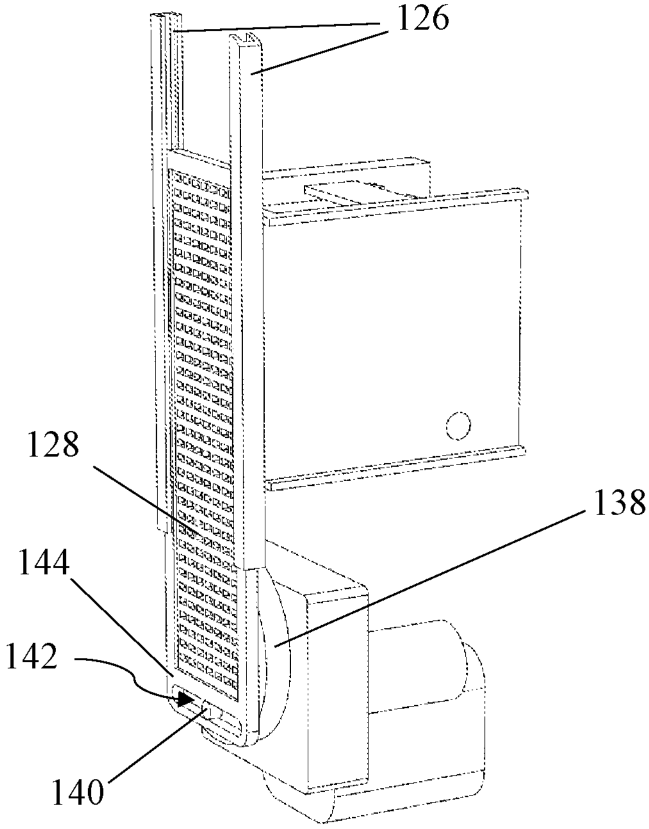
FIGS. 10 and 11 are perspective views of the internal components of the grater and dispenser of FIG. 8.
Figure 11:
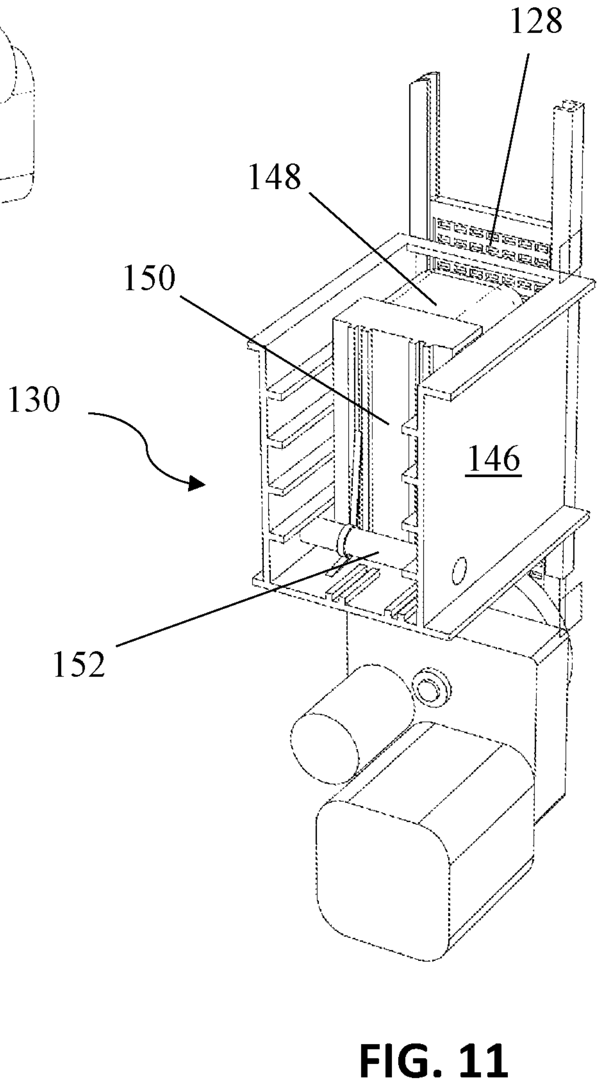

FIGS. 9-11 show the main internal working components include electric motor 122, transmission 124, guide channel 126, serrated plate 128, product feeder 130, and operation circuit 132.

Electric motor 122 is preferably a continuous duty, low-speed (16 rpm max.), high-torque (starting at 640 in.-oz.) motor of relatively small size to fit within housing 112. It is powered by operation circuit 132, shown as a battery-powered circuit with battery box 134. Alternatively, operation circuit 132 may include an AC plug and transformer for energizing the circuit (not shown).

Transmission 124 is shown as a scotch-yoke-type transmission that converts rotational energy from the motor's driveshaft 136 into linear reciprocating motion of serrated plate 128. FIG. 10 shows crank member 138 is fixed to driveshaft 136 (FIG. 9), and has pin 140 that engages slot 142 of connecting plate 144. This arrangement results in serrated plate 128 moving in a vertical, reciprocating motion within guide channel 126, adjacent product feeder 130.

FIG. 11 shows product feeder 130 has a three-wall chute 146 that holds bar soap 148 in place. Movable plate 150 is spring-loaded by spring tensioner 152 that pushes (urges) bar soap 148 toward serrated plate 128 such that when activated, the serrations of serrated plate 128 cut (shave) off pieces of bar soap 148 that then drop through opening 118 as shown in FIG. 13.

Operation circuit 132 generally comprises proximity detection sensor 154 (FIG. 9), circuit board 156, and power source 134. Different types of proximity sensors and sensor arrangements may be used to accomplish actuation of operation circuit. For example, the proximity sensor depicted in FIG. 9 may be an infrared proximity sensor in a retro-reflective arrangement where the sensor's emission is reflected off stand 114, or, alternatively, it may be arranged as a diffuse sensing field in instances where stand 114 is not used.

Figure 12:
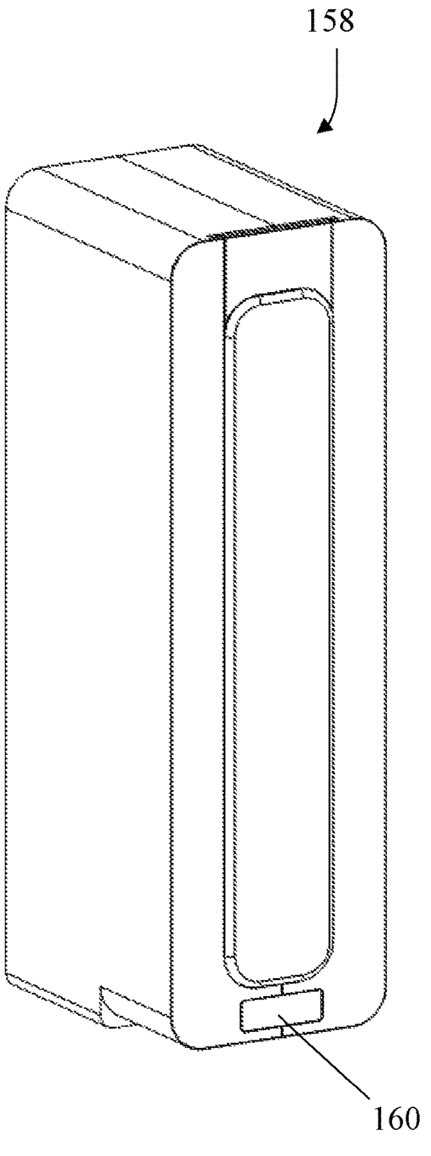
FIGS. 12 and 13 show front and rear views of another embodiment of a soap grater and dispenser according to the invention.
Figure 13:
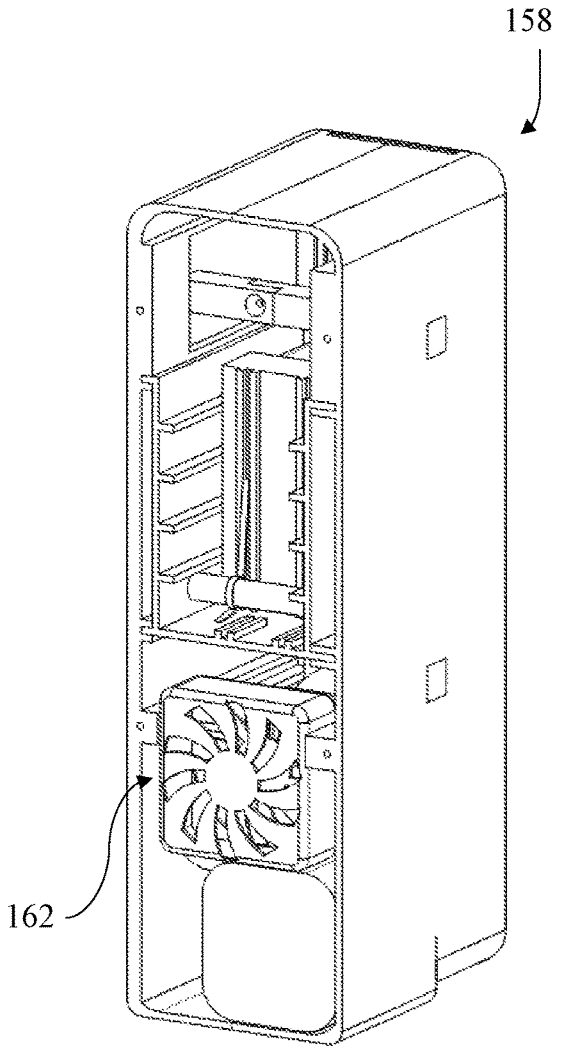

FIGS. 12 and 13 show another preferred embodiment of a soap grater and dispenser 158 according to the invention that incorporates liquid crystal display (LCD) 160 and exhaust fan 162. LCD 160 is wired in circuit with the operation circuit and may be programmed to display information relating to grater/dispenser 158's operation, such as number of times soap has been dispensed since last reset, for example. Integration of larger, more capable displays are also contemplated, such as color displays advertising the soap being dispensed or other paid advertising that may be changed and/or updated through wireless connectivity. In these situations, the LCD would not necessarily be wired in with the operation circuit. Exhaust fan 162 is also connected in circuit with the operation circuit and is preferably programed to turn on for a period of time when the proximity detection sensor actuates the operation circuit, such that fragrance from the soap is exhausted through the dispenser opening in the housing when soap is dispensed.

Figure 14:
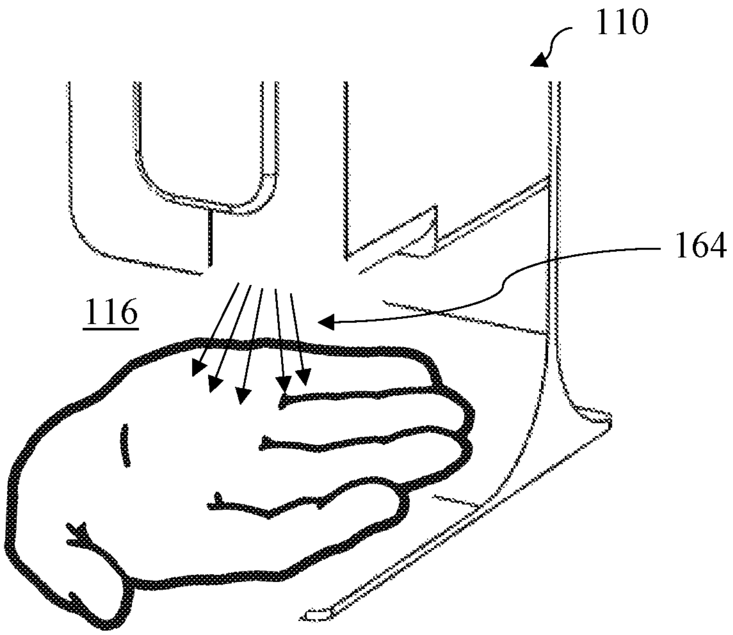
FIG. 14 depicts how a user interfaces with the proximity sensor field of the grater and dispenser of FIG. 8.
Figure 15:
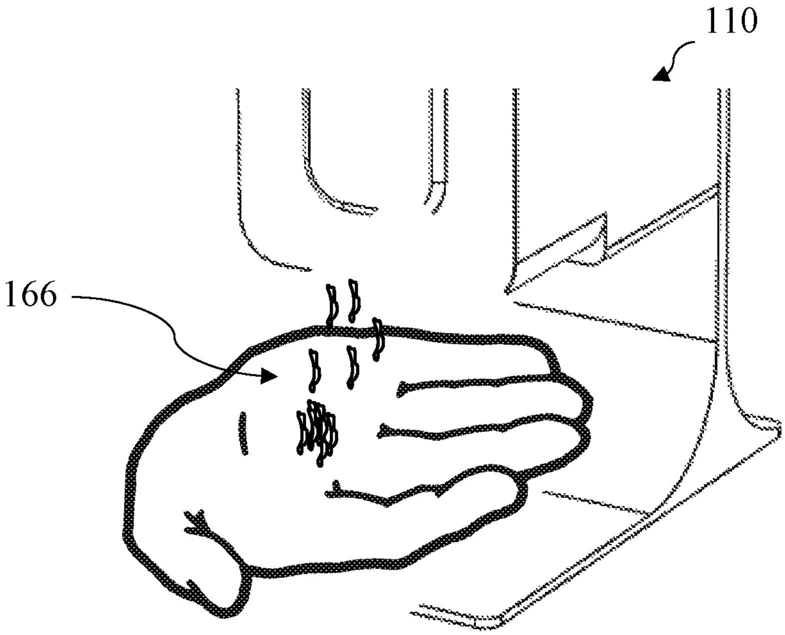
FIG. 15 shows how product is dispensed by the grater and dispenser of FIG. 8.

FIGS. 14 and 15 show how a soap grater and dispenser according to the invention is used in context of the preferred embodiment show in FIGS. 8-11. A user place a hand within dispensing area 116, beneath opening 118 such that sensor field 164 of the proximity sensor is interrupted. This sends a reference signal to the operation circuit which energizes the motor. Reciprocation of the serrated plate by way of the transmission then shaves off pieces of soap 166 from the soap bar which drop into the user's hand. The operation circuit energizes the motor for a length of time which is adjusted based upon the desired amount of soap to be dispensed.

While the invention has been described in connection with preferred embodiments, they are not intended to limit the scope of invention to the particular forms set forth, but on the contrary, they are intended to cover such alternatives, modifications, and equivalents as may be included within the spirit and scope of the invention as defined by the appended claims. For example, there may be additional compartments built into the housing to hold a stick of aromatic material such as scented soap, or scented liquid.

It should be further understood that grater-dispensers according to this invention may be designed for use with other products of similar character to bar soap. For example, a grater-dispenser according to this invention may be designed more specifically for other bar or block congealed products, such as blocks of cheese for example.

What is claimed is:

1. A congealed product grating and dispensing machine, comprising:

a housing having an aperture through a wall thereof;

an electric motor mounted within said housing and having a rotatable driveshaft;

a guide channel oriented perpendicularly to said driveshaft's axis of rotation and mounted within said housing, over said aperture of said housing;

a serrated plate slidably engaged with said guide channel;

a transmission connecting said driveshaft to said serrated plate, translating rotational movement of said driveshaft into reciprocating movement of said serrated plate when said motor is energized;

a congealed product feeder mounted stationary within said housing and arranged perpendicularly adjacent said guide channel, biased to feed congealed product toward said guide channel;

an actuator in circuit with said motor, energizing said motor for a preset time period when actuated; and an electric fan mounted within said housing, adjacent said feeder, and in circuit with said actuator, said fan positioned to blow air toward said feeder and out said aperture.

2. A congealed product grating and dispensing machine, comprising:

a housing having an aperture through a wall thereof;

an electric motor mounted within said housing and having a rotatable driveshaft;

a guide channel oriented perpendicularly to said driveshaft's axis of rotation and mounted within said housing, over said aperture of said housing;

a serrated plate slidably engaged with said guide channel;

a transmission connecting said driveshaft to said serrated plate, translating rotational movement of said driveshaft into reciprocating movement of said serrated plate when said motor is energized;

a congealed product feeder mounted stationary within said housing and arranged perpendicularly adjacent said guide channel, biased to feed congealed product toward said guide channel;

an actuator in circuit with said motor, energizing said motor for a preset time period when actuated;

a second aperture through a wall of said housing; and a programmable display mounted in said second aperture.

3. The congealed product grating and dispensing machine of claim 2, wherein said programmable display is in circuit with said actuator.

* * * * *